United States Patent [19]
Hogenhout
[11] 4,144,625
[45] Mar. 20, 1979

[54] SEALANT APPLICATOR APPARATUS FOR AUTOMATIC RIVETING MACHINES AND THE LIKE

[75] Inventor: Franciscus Hogenhout, Bellevue, Wash.
[73] Assignee: The Boeing Company, Seattle, Wash.

[21] Appl. No.: 853,413
[22] Filed: Nov. 21, 1977
[51] Int. Cl.[2] ........................ B21J 15/10; B29C 13/00
[52] U.S. Cl. ........................................ 29/34 B; 29/39; 29/243.53; 29/458; 29/526 A; 92/2; 118/215; 118/254; 264/262; 427/285
[58] Field of Search .................. 29/33 J, 33 K, 26 A, 29/34 B, 39, 458, 526, 526 A, 243.53; 118/215, 243, 244, 254, 263; 427/239, 285; 264/262; 92/2

[56] References Cited

U.S. PATENT DOCUMENTS 3,350,774 11/1967 Bridges, Sr. ........................ 29/458 X
3,747,193 7/1973 Gregory ............................ 29/243.53

*Primary Examiner*—Othell M. Simpson
*Assistant Examiner*—Z. R. Bilinsky
*Attorney, Agent, or Firm*—Christensen, O'Connor, Johnson & Kindness

[57] ABSTRACT

A sealant applicator apparatus is disclosed of a form adapted for incorporation in automatic riveting machines and the like as one of the positionally indexed, sequentially operated tools in the machine along with the usual drill, countersink tool and riveter. Mounted and actuated under controlled pressure in position to pick up a bead of sealant from a supply source during one of the indexed functions of the riveter machine, the sealant applicator later in the sequence is automatically positioned over the countersunk hole and actuated under controlled pressure to deposit the bead of sealant on the countersink surface as a step preceding insertion and bucking of the rivet. An air motor rotating the flexibly deformable, rounded sealant applicator tip is itself mounted as a reciprocative piston in a support cylinder into which pressurized air is introduced so as to advance the applicator tip toward the sealant source and alternately toward the workpiece, and, in the process of each such advancement, to initiate rotational operation of the air motor. The pneumatic pressure advancing the air motor in the cylinder acts against a return spring in a balance of forces that can be adjusted relatively so as to exert a precisely controlled amount of pressure of the applicator tip against the sealant source bed or mandrel so as to pick up a bead of sealant, and also thereafter against the countersink surface so as to deposit the bead on the countersink surface. Rotation of the applicator tip during acquisition and separation of a sealant bead from the supply source, and also during deposit of that bead on the countersink surface followed by separation of the applicator tip therefrom, prevents smearing and stringing of the sealant. By stopping or reducing tip rotation in the interim, centrifugal force effects are prevented from impairing the original shape and position of the sealant bead on the applicator tip.

15 Claims, 5 Drawing Figures

SEALANT APPLICATOR APPARATUS FOR AUTOMATIC RIVETING MACHINES AND THE LIKE

BACKGROUND OF THE INVENTION

This invention relates to sealant applicator apparatus, and more particularly, to apparatus of a form and nature lent to incorporation in automatic riveting machines and the like. The invention is herein illustratively described as applied in an automatic riveting machine of a commercial type known by the trademark "Gemcor", model 2A or 2B manufactured by General Electro-Mechanical Corp., 785 Hertel Avenue, Buffalo, N.Y. However, it will be recognized that the concepts of the invention may be otherwise embodied and applied.

In the aircraft industry and elsewhere, sealant materials such as curable viscous liquid resins are often used in and around rivet holes and the like to protect the interface surfaces against corrosion where different metals are used, and also in applications wherein a liquid-tight seal is desired such as in manufacturing fuel tanks and the like.

Techniques for sealing rivet holes and the like are disclosed in U.S. Pat. Nos. 3,655,424; 2,957,237; 3,341,934; 3,478,409; and, in an automatic fastener machine, in U.S. Pat. No. 3,350,774.

It is also important in such manufacturing operations wherein a large number of rivets are required over the area of a structural part or surface to perform the riveting operations rapidly. For these purposes, automatic riveting machines including drills, countersink tools and riveters have long been used. Examples of automatic riveting machines in addition to the commercial machine mentioned above are disclosed in U.S. Pat. Nos. 3,747,913; 2,488,645; and 2,216,403.

To be most useful in such operations, therefore, it is important that the function or step of applying liquid sealant to the rivet, or rivet hole face or rim be synchronized with operation of an automatic riveting machine and preferably that it be incorporated directly in that machine so as to be synchronized with its other operations. Kuehn, Jr. U.S. Pat. No. 3,904,718 discloses a countersink sealant machine of comparatively recent interest. Still more recently and more closely pertinent to the present invention is the copending application of Josiah Thomas Duryea, Ser. No. 847,575, filed Nov. 1, 1977 and assigned to the same assignee. The sealant applicator disclosed in said copending application represents an improved device for forming and applying a bead of sealant to a countersink surface in conjunction with the operation of a riveting machine. In that device rotation of the applicator tip accompanying dipping the same into a reservoir and removing it therefrom is utilized as a means to acquire a suitably formed bead of sealant from a supply source. Combined rotation and reciprocation are also used to deposit the bead of sealant on the bore countersink surface of the rivetable part without stringing or smearing.

An object of the present invention is to provide a rotating type sealant applicator with improved actuating means, and more particularly one of a compact form well suited for incorporation in automatic riveting machines or the like of the type incorporating rotatable or translatable multitool carriages that can be positionally indexed in a recycling sequence in relation to the workpiece holder.

Another object hereof is to provide an improved sealant applicator with improved means for selectively adjusting and consistantly maintaining the force exerted by the rotating applicator tip against the sealant supply source reservoir bed in picking up a bead of sealant, and thereafter in applying the bead of sealant to the workpiece surface such as on a bore countersink surface. As a result, a band of desired configuration is deposited without stringing and consistently centered on the countersink surface. Furthermore, the precisely controlled adjustability of the sealant applicator operating mechanism and, more particularly, the critical force adjustment referred to, assures consistency in the volume of the material incorporated in the sealant bead so as to avoid wastage and also to avoid surface smear left from the riveting operation. It is also an object to form and maintain the desired sealant bead shape on the applicator tip for application to the workpiece.

BRIEF DESCRIPTION OF THE INVENTION

In the disclosed embodiment the sealant applicator tip is driven rotatively by an air motor, the casing of which functions as a piston reciprocative in an air cylinder mounted in parallel relation to a drill, riveting tool and countersink tool in an automatic riveting machine. Air under pressure to activate the piston/motor is introduced into the upper end of the air cylinder through an elongated tubular rod supporting a return spring for the piston/motor assembly and thereby simultaneously applies rotational torque to the motor shaft and displaces the same downwardly against the return force of the spring. The rotating applicator tip thus advances initially into contact with a sealant reservoir bed (screen) supporting a predetermined level of liquid sealant material. Air pressure balanced against the adjustable return force of the spring at the end of this stroke and for the brief dwell period thereafter produces an applicator tip pressure of the correct value to acquire the desired volume of sealant material as an annular bead of desired radius. This is assured by the controlled degree to which the deformable rounded applicator tip flattens under applied pressure. With the tip rotated in the sealant pool and thereafter as it is retracted upon removal of air pressure from the cylinder, the acquired sealant bead is cleanly severed from the reservoir.

In a subsequent indexing operation of the riveting machine, the applicator tool is precisely centered over the predrilled and countersunk rivet hole in the associated part or workpiece. Thereupon repressurization of the air cylinder and operation of the air motor advances and rotates the applicator tip carrying the sealant bead downwardly into contact with the countersink surface so as to deposit the bead centrally and cleanly thereon.

Cessation or reduction of the applicator tip rotation by the air motor in the interval between acquisition of a sealant bead and deposit of that bead on the workpiece represents a further feature of the invention. The tip is rotated only as necessary, i.e., during acquisition and deposit of sealant, and thereby avoids the problem of smear or spread of the bead across the surface of the applicator tip by centrifugal force during the interim period. As a result, a more desirably shaped bead is formed and correctly concentrated on the applicator tip for deposit on the countersink surface.

By thus relying upon adjusted or controlled applicator tip force as a means of establishing applicator tip position during acquiring and forming the sealant bead on the applicator tip, and also in depositing said bead on the workpiece surface, improved results are achieved.

The foregoing aspects of the improved applicator relate to a further feature, namely the purely axial reciprocative movement of the applicator tip accompanying its rotation during acquisition and deposit of the bead, particularly in an indexable riveting machine, so as to assure a precisely positioned bead deposit on the workpiece (bore countersink) surface.

The foregoing and related features, objects and advantages of the invention will become apparent to those skilled in this art from an understanding of the nature and function of the illustrative embodiment hereinafter described.

DESCRIPTION OF THE PREFERRED EMBODIMENT

Figure 1:
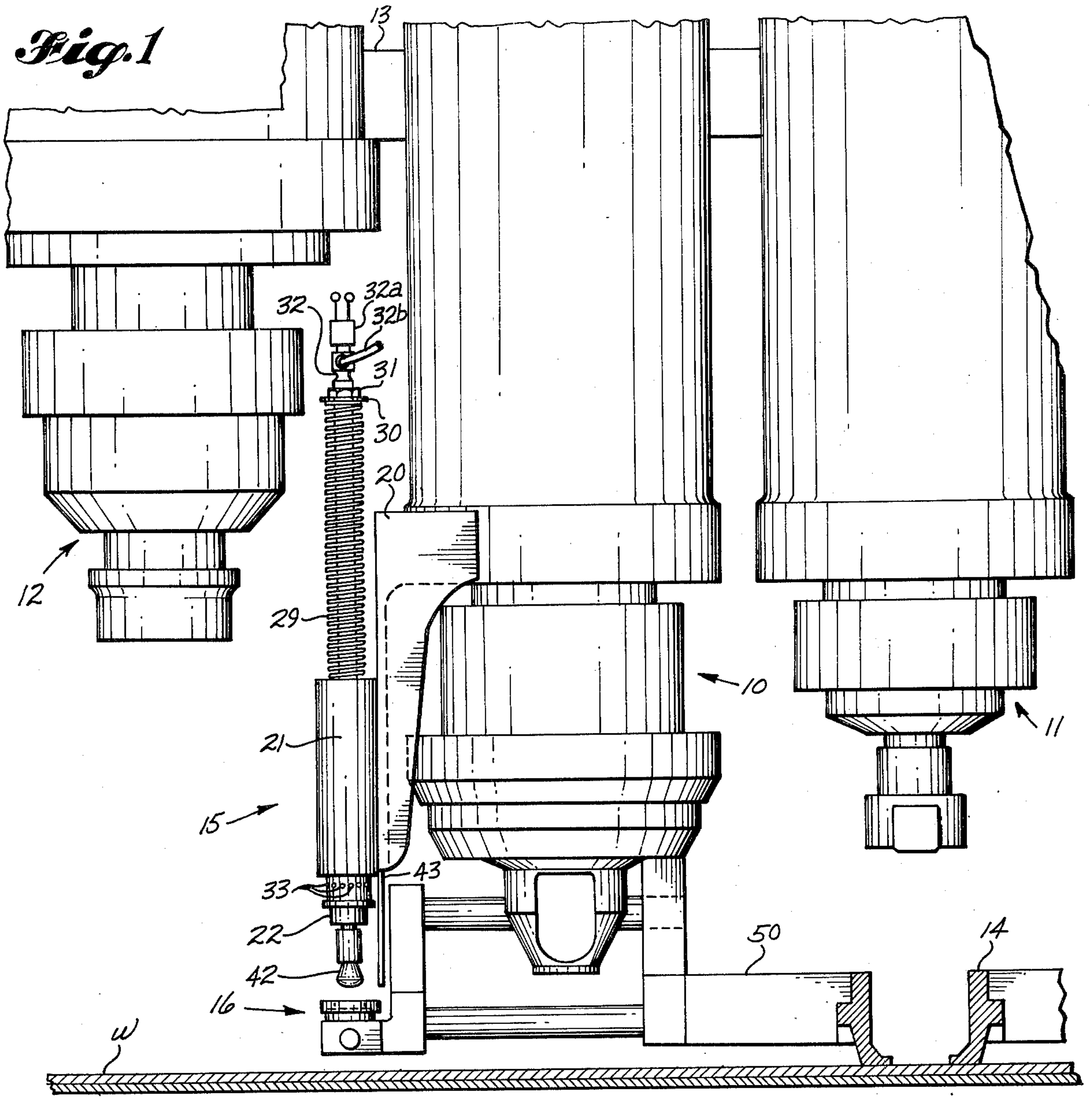
FIG. 1 is a front elevation view of a portion of a riveting machine, the view depicting the tool transfer carriage, the riveter, the drill, the shaver tool, the novel sealant applicator apparatus, the associated sealant supply means and the work support and holder.
Figure 2:
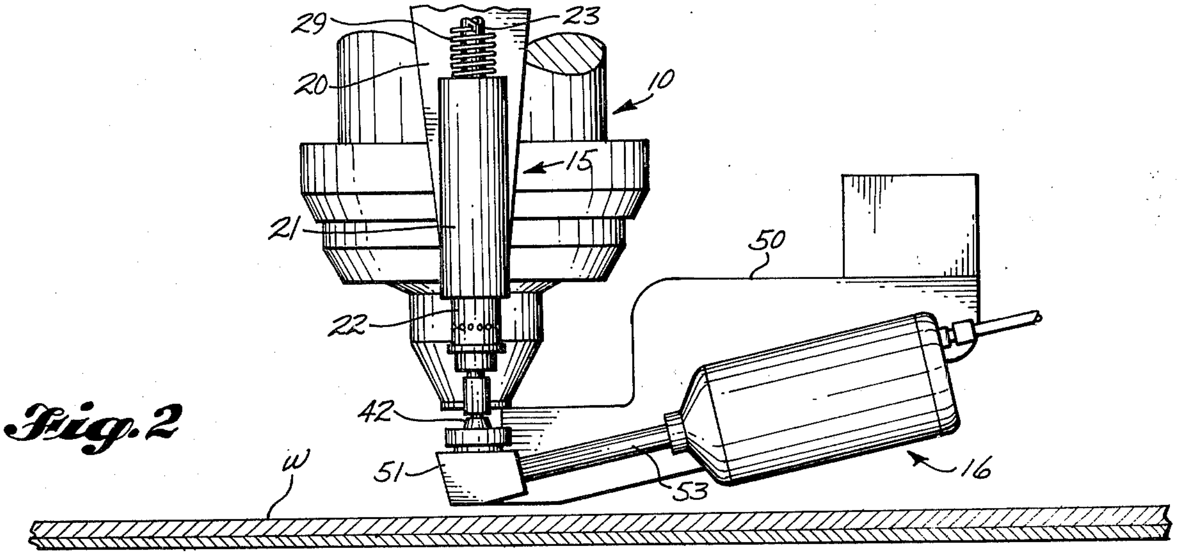
FIG. 2 is a fragmentary side elevation view depicting a portion of the sealant applicator and sealant supply means associated therewith.

In FIG. 1 the automatic riveting machine transfer carriage 13 mounts a drill 11, a rivet head shaver 10 and a riveter 12 positioned overlying workpieces W to be drilled, countersunk and riveted together. For convenience in illustration the drawing omits showing the tool elements themselves, including the drill bit formed with the usual countersink cutter, the shaver bit and the rivet hammer bit. A stationary pressure foot 50 suitably mounted on the machine frame includes a holddown bushing 14 that presses the workpieces firmly together when the machine is ready for operation. A conventional indexing mechanism in the machine establishes a series of predetermined stopping points of the transfer carriage in which, first, the drill 11, thereafter the riveter 12, and then the rivet head shaver 10 are positioned and operated in superimposed registry with the central axis of the bushing 14. The present invention contemplates adding to such a machine in the preferred embodiment, a sealant applicator tool 15 and an associated liquid sealant supply source 16. The indexing settings of the transfer carriage are thereupon made to include a stopping position for the carriage with the sealant applicator tool 15 positioned in coaxial alignment with the pressure foot bushing 14 at a point in the transfer sequence of the carriage between operation of the drill 11 and operation of the riveter 12. For this purpose, the sealant applicator unit 15 is conveniently mounted by a bracket 20 on the side of the rivet head shaver 10 adjacent the riveter 12, and the sealant supply source unit 16 is conveniently mounted on the holddown foot 50 in a position to register with the sealant applicator 15 at that point in the indexing sequence of the transfer carriage when the drill 11 is in registry with the pressure foot bushing 14. This is as depicted in FIG. 1. In this setting of the transfer carriage, operation of the drill 11 can then be accompanied by simultaneous operation of the sealant applicator tool 15 to acquire a bead of sealant material from the source 16 preparatory to deposit of that bead on the countersink surface to be formed by the tool 10 in the hole bored by the drill 11.

In the preferred embodiment, the sealant supply source 16 is or may be similar to that disclosed in the above-said copending Duryea application, as may be the flexible (i.e. vinyl or rubber) applicator tip 42 mounted on and as part of the applicator tool dauber 40. Dauber 40 is mounted on the end of an air motor shaft 41, the air motor itself being mounted within a casing 22 that is slidably received as a piston in the bracket-mounted air cylinder 21.

Briefly described, the sealant supply source comprises a pot 51 into which sealant is delivered to a regulated level under controlled pressure through a hose 53. Threaded onto the upper rim of the pot 51 is a centrally open cap 56 that clamps one or more mutually superimposed bed screens 54 over the opening of the pot to form a shallow reservoir into which the viscous sealant is forced upwardly through the screen to a controlled level to be contacted by the flexible applicator tip 42 in the manner disclosed in said Duryea application. Also, as disclosed in said application, rotation of the applicator tip 42 while pressed downwardly to flatten its rounded end to the desired extent against the screen 54, causes the applicator tip to pick up a bead of sealant material of desired radius and to shear that bead from the body of the sealant material on the screen when the rotating tip is retracted upwardly from the screen so as to avoid stringing.

In the present invention, importance is attached to advancing and retracting the rotative applicator tip in a straight line into and from engagement with the bath of sealant material bedded on the screen 54, and also to the provision of an actuator device for the applicator tip that causes the tip to exert adjustable predetermined force against the supply source bed screen and thereafter a related force against the work surface to receive the sealant bead.

Extension and retraction of the sealant applicator tip 42 and controlled pressure exerted by the tip on the supply source bed, or alternatively on the workpiece, are achieved by a simple pneumatic arrangement which simultaneously provides the pressurized air to drive the air motor for rotating the applicator tip. Moreover, these functions are performed in a compact mechanism of consistently reliable operation in a manner that interrelates the driving torque rotating the applicator tip and the contact pressures exerted by the tip on the source bed screen and thereafter on the workpiece bead deposit surface. To these ends, the air motor casing 22 has a central inlet in its upper end formed by a nipple 25 upon which is threaded a fitting 24 of smaller diameter than the exterior of the casing 22. The fitting 24 has a central passage communicating with the interior of an elongated tubular guide rod 23 that projects slidably through the upper end of air cylinder 21. Surrounding this rod is a piston return spring 29 reacting between the top of the air cylinder 21 and a stop 30 held in any of selectively adjustable positions by a stop nut 31 threaded on the upper end of the rod 23. Rubber o-rings 26 and 34 seal the slidable rod 23 and the motor casing/-piston unit 22 at the ends of the air cylinder 21. As shown the spring is long in relation to stroke of the unit 22 such that its force does not change by a major percentage during the stroke.

Figure 3:
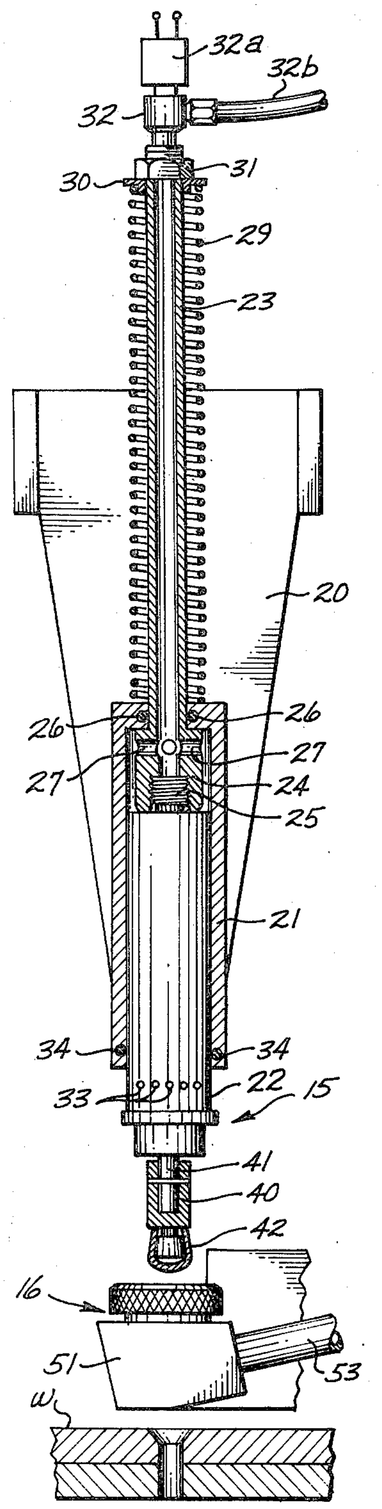
FIG. 3 is a side elevation view at enlarged scale with parts broken away showing the sealant applicator mechanism with the applicator tip retracted in registry with the sealant supply source.

A three-way solenoid actuated valve 32 operated by a solenoid 32*a* is interposed between an air pressure hose 32*b* and the open upper end of the supply rod 23. In one setting of the valve 32 air under pressure from a source (not shown) is delivered through the rod 23 to the air motor so as to turn the rotary applicator tip 42. Simultaneously such pressurized air bleeds through radial ports 27 in the fitting 24 into the upper end or chamber of the pneumatic cylinder 21 so as to urge the air motor/piston 22 downwardly from its retracted position shown in FIG. 3 to either of its extended positions shown in FIGS. 4 and 5 respectively. In the other setting of the three-way valve 32, the supply of pressurized air from the pressure hose 32*b* is cut off and the upper end of the air cylinder 21 is exhausted into the atmosphere. Discharge ports 33 in the lower end of the air motor casing 22 also provide a means to relieve pressure in the upper end of air cylinder 21.

Figure 4:
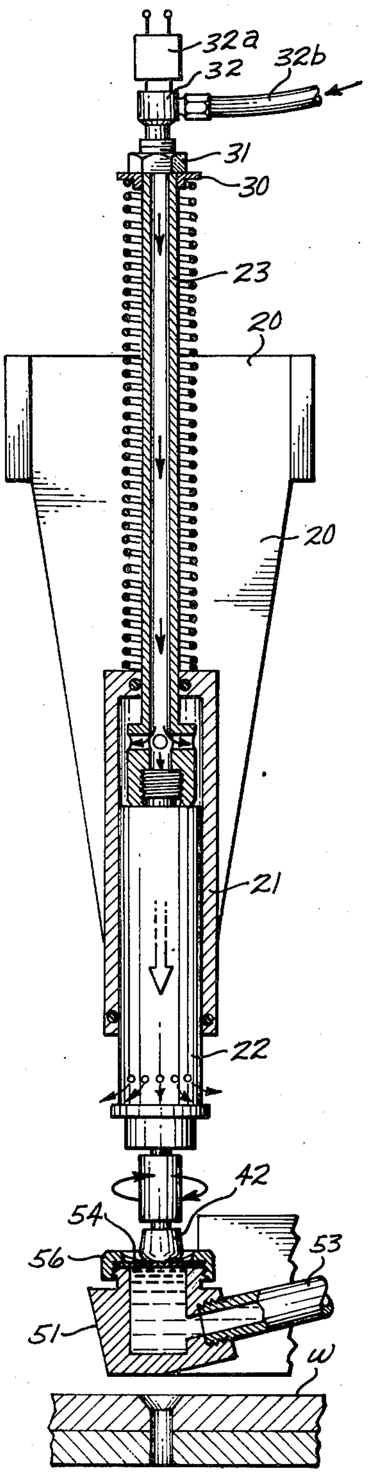
FIG. 4 is a view similar to FIG. 3 with the applicator tip advanced into engagement with the supply source to acquire a bead of sealant material and with the supply source shown partially in section.
Figure 5:
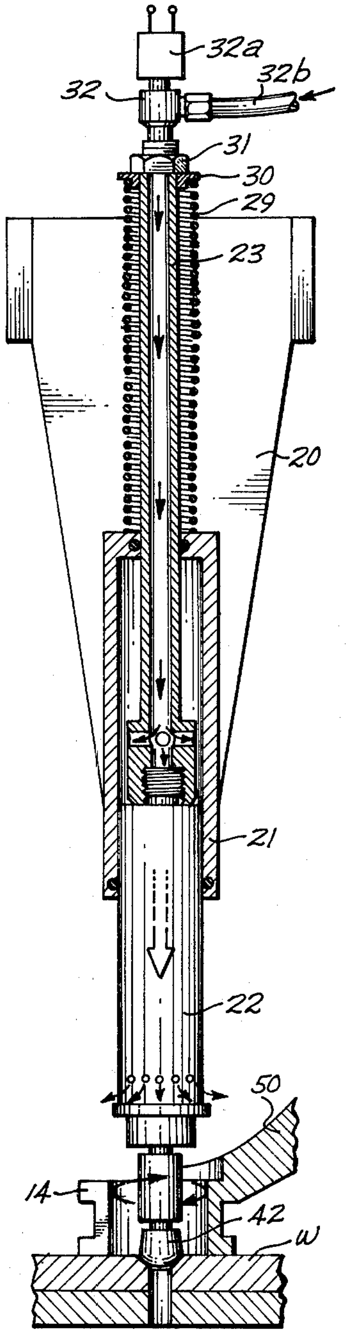
FIG. 5 is a view similar to FIG. 4 with the applicator tip advanced against a countersink surface in a workpiece held in place by a pressure foot bushing, again certain parts being shown in section.

It will be observed in the comparison of FIGS. 4 and 5, that the extended position of the applicator tip 42, when it is applying the acquired sealant bead to the countersink surface of the workpiece W, causes a greater degree of compression of the return spring 29 than does the lesser extended position of the applicator tip 42 when it is advanced into engagement with the sealant supply device 16. Accordingly, with the same pressure of air delivered through the supply hose 32*b* during these alternate extension operations, it will be evident that a lesser force is applied by the applicator tip to the workpiece surface than the force applied by the applicator tip to the bedding screen 54 in the supply source unit 16. This is as it should be inasmuch as a certain degree of compression or deformation of the flexible applicator tip 42 is desired in the acquisition of a sealant bead, whereas comparatively little or no deformation of the applicator tip is required, or indeed desired, when the sealant bead is pressed against and deposited on the countersink surface. Assuming air pressure from the source remains constant, this difference in exertion force of the applicator tip in the two operating stages is, of course, occasioned by the difference in height of the bedding screen 54 in the supply source and the workpiece W beneath the pressure foot bushing 14.

Precise adjustment of pressure exerted by the applicator tip 42 alternately on the supply source screen 54 and on the workpiece W may be effected by changing the air pressure delivered through the supply hose 32*b*, or by adjusting the setting of the stop nut 31, or both. In addition, the mechanism can be adapted to provide adjustable positioning of the mounting bracket 20 on the supporting part of the rivet head shaver 10 carrying it.

A guard or screen 43 interposed between the sealant applicator tool 15 and the adjacent the rivet head shaver 10 prevents drill and countersink chips from flying into or against the applicator components.

In the operation of the riveter machine, a suitable timing mechanism (not shown) causes appropriate cycling of the operating tools, including the sealant applicator, in relation to positioning movement of the transfer carriage into its successive indexing positions in relation to the work holddown bushing 14. The first step in the total cycle is to actuate the drill motor and advance the drill against the workpieces W with the drill registered with the holddown bushing 14. Simultaneously therewith, the applicator tip is advanced downwardly against supply source 16 by energization of valve control solenoid 32*a* to apply pressurized air to cylinder 21 through rod 23 and fitting 24. Such pressurized air causes advancement of the air motor/piston unit 22 downwardly in the air cylinder 21 and simultaneously introduces pressurized air into the air motor so as to turn the air motor shaft 41 and thereby the applicator tip 42. As the applicator tip accelerates in rotational speed, it reaches contact with the applicator fluid on the bedding screen 54. Continued exertion of pressure by the piston/air motor 22 causes a flattening of the flexible applicator tip 42 so as to increase the diameter of its area of contact with the screen to the desired point of equilibrium. Continued rotation of the air motor and thus, of the applicator tip, causes the tip to pick up an annular bead of sealant fluid in the annular reentrant groove or space formed between the screen and the periphery of the applicator tip, which bead is completed and severed from the body of sealant material when the applicator tip, still rotating, is retracted upwardly from the screen. This avoids stringing and leaves a clean bead of rounded cross section at the correct radius on the applicator tip to match up with the average radius of the countersink surface in the bored hole in the workpieces W. It will be noted that some component drop of pressure in the supply lines leading to the upper end of the air cylinder 21 occurs during advancement of the air motor 22 as a piston that does not occur when the air motor reaches its terminal extended positioned. At this point, the reduced drop of pressure in the lines causes an increase of pressure available to turn the motor, and thereby, a corresponding increase in the acceleration rate of the air motor while the applicator tip dwells on the supply source screen 54. However, when the solenoid valve is subsequently actuated by the solenoid 32*a* to cut off the supply of pressurized air from the hose 32*b* and relieve pressure in the air cylinder, attended by retraction of the air motor and applicator tip due to the return force of spring 29, the motor quickly decelerates since the pressurized air in the air cylinder is quickly discharged into the atmosphere, both through the valve 32 and through the ports 33 in the air motor housing.

In the next step of the machine operation, the transfer carriage is shifted in position to bring the sealant applicator tool 15 in registry with the holddown bushing 14. With the sealant applicator thus indexed, the solenoid valve 32 is opened to a supply of air under pressure to the air cylinder 21 so as to advance the air motor/piston unit 22 in the air cylinder 21 and to simultaneously initiate rotation of the applicator tip 42. By the time the applicator tip 42 has reached contact with the workpiece W it is rotating, but not so rapidly that centrifugal force disturbs the position of sealant on the applicator tip. When such contact does occur, however, rotational speed increases more rapidly under the influence of increased air pressure available in air cylinder 21. Hence, only a short dwell time of the applicator tip on the countersink surface is necessary for the rotating tip to complete the deposit of the bead and spread it out as a band on the countersink surface. Thereupon retraction of the still rotating applicator tip is effected by reversal of the position of the valve 32. Thereafter, the riveting tool 12 is brought into indexed position relative to the holddown bushing 14. Meanwhile, a rivet has been inserted either manually or by suitable means, not illustrated, so as to capture the bead of sealant material between the head of the rivet and the countersink surface in the rivet hole. Subsequently with the riveting tool retracted, the carriage is again retracted to bring the shaver into registry with holddown bushing 14. The shaver 10 then shaves the rivet flush with the upper surface of the workpiece.

These, and other aspects of the invention will be evident to those skilled in the art based on an understanding of the foregoing description and illustration of the preferred embodiment thereof.

The embodiments of the invention in which an exclusive property or privilege is claimed are defined as follows:

1. In liquid sealant applicator apparatus cooperable with an open sealant reservoir means to form and pick up an annular bead of sealant therefrom and to deposit such bead on a workpiece, elongated pressure-fluid cylinder means having a longitudinally reciprocative piston means therein, said piston means comprising a rotary pressure-fluid operated motor having a central drive shaft projecting from one end of said cylinder, said shaft having sealant applicator tip means thereon adapted while being rotated by said motor to be advanced by said piston means into contact with and to be withdrawn from said reservoir means to acquire a bead of sealant therefrom, and alternatively into contact with and retraction from a workpiece so as to deposit said bead of sealant thereon, pressure-fluid supply means selectively operable to deliver pressure-fluid for selected periods into the end of said cylinder opposite said shaft, thereby to exert advancement force on said piston means and simultaneously rotational drive torque in said motor, and retraction means operable to exert retraction force on said piston means opposite said advancement force, thereby to effect retraction of the applicator tip from the reservoir means and simultaneously rotational deceleration thereof upon cessation of such delivery of pressure-fluid.

2. The combination defined in claim 1, in which the retraction means comprises spring means exerting continuous retraction force on the piston means and thereby opposing said advancement force, whereby force of the applicator tip means against the sealant reservoir means and thereafter against the workpiece is related to the difference between said retraction force and advancement force, said applicator tip means being formed and cooperable with said sealant reservoir means so as to increase and decrease the area of contact between them, thereby to increase and decrease the diameter of the acquired sealant bead, with increase and decrease respectively of said difference between forces.

3. The combination defined in claim 2, including an elongated piston rod mounted coaxially with said piston means, said spring means comprising an elongated helical spring mounted surrounding said rod to forcibly resist such pressure-fluid force advancement of said piston means.

4. The combination defined in claim 3 wherein the piston rod projects from said piston means oppositely from said shaft, is tubular and forms a pressure-fluid conduit between said pressure-fluid supply means and said motor, and means, having a bleed passage from such conduit into the cylinder, connecting the piston rod to the piston means, whereby pressure-fluid delivered through the piston rod simultaneously advances the piston means and drives the motor.

5. The combination defined in claim 2 including means to adjustively vary the retraction force exerted on the piston means.

6. The combination defined in claim 2 including a workpiece holder fixedly positioned in relation to said reservoir means, and a mount for the cylinder movably supporting the same for alternative positioning in operating alignment with the reservoir means and holder, respectively, said mount maintaining the cylinder and thereby the retracted piston means in each of said operating alignment positions at predetermined spacings from said reservoir means and said holder respectively.

7. The combination defined in claim 6 including means to adjustively vary said spacings in order to vary the pressure of said applicator tip respectively against said reservoir means and against the workpiece.

8. The combination defined in claim 6 including means to adjustively vary precompression of said spring means in order to vary the pressure of said applicator tip respectively against said reservoir means and the workpiece.

9. The combination defined in claim 1 wherein the apparatus comprises a riveting machine further including drill, countersink and riveting tools operatively mounted together with said pressure-fluid cylinder on a position indexed transfer carriage in predetermined spaced relationship on said carriage and with the operating axes of said tools and said piston means and applicator tip parallel.

10. The combination defined in claim 9, in which the retraction means comprises spring means exerting continuous retraction force on the piston means and thereby opposing said advancement force, whereby force of the applicator tip means against the sealant reservoir means and thereafter against the workpiece is related to the difference between said retraction force and advancement force, said applicator tip means being formed and cooperable with said sealant reservoir means so as to increase and decrease the area of contact between them, thereby to increase and decrease the diameter of the acquired sealant bead, with increase and decrease respectively of said difference between forces.

11. The combination defined in claim 10, including an elongated piston rod projecting centrally from and reciprocative with said piston means, said spring means comprising an elongated helical spring mounted surrounding said rod to forcibly resist such pressure-fluid force advancement of said piston means.

12. The combination defined in claim 11 wherein the piston rod projects coaxially from said piston means oppositely from said shaft, is tubular and forms a pressure-fluid conduit between said pressure-fluid supply means and said motor, and means, having a bleed passage from such conduit into the cylinder, connecting the piston rod to the piston means, whereby pressure-fluid delivered through the piston rod simultaneously advances the piston means and drives the motor.

13. The combination defined in claim 9 including a workpiece holder fixedly positioned in relation to said reservoir means, and a mount for the cylinder movably supporting the same for alternative positioning in operating alignment with the reservoir means and holder, respectively, said mount maintaining the cylinder and thereby the retracted piston means in each of operating alignment positions at predetermined spacings from said reservoir means and said holder respectively.

14. The combination defined in claim 13 including means to adjustively vary said spacings in order to vary the pressure of said applicator tip respectively against said reservoir means and against the workpiece.

15. The combination defined in claim 13 including means to adjustively vary precompression of said spring means in order to vary the pressure of said applicator tip respectively against said reservoir means and the workpiece.

* * * * *